United States Patent
Vendrow

(10) Patent No.: US 10,205,974 B1
(45) Date of Patent: Feb. 12, 2019

(54) SYSTEMS AND METHODS FOR PROVIDING SHARED MEMORY POINTERS TO A PERSISTENT VIDEO STREAM FOR USE IN A VIDEO COMMUNICATIONS SESSION

(71) Applicant: RingCentral, Inc., Belmont, CA (US)

(72) Inventor: Vlad Vendrow, Reno, NV (US)

(73) Assignee: RingCentral, Inc., Belmont, CA (US)

(*) Notice: Subject to any disclaimer, the term of this patent is extended or adjusted under 35 U.S.C. 154(b) by 0 days.

(21) Appl. No.: 15/870,792

(22) Filed: Jan. 12, 2018

(51) Int. Cl.
| G06F 15/16 | (2006.01) |
| H04N 21/234 | (2011.01) |
| H04N 21/438 | (2011.01) |
| H04N 21/643 | (2011.01) |
| H04L 29/06 | (2006.01) |
| H04N 7/15 | (2006.01) |

(52) U.S. Cl.
CPC ..... *H04N 21/23406* (2013.01); *H04L 65/602* (2013.01); *H04L 65/80* (2013.01); *H04N 21/4384* (2013.01); *H04N 21/64322* (2013.01); *H04N 7/155* (2013.01)

(58) Field of Classification Search
CPC . H04L 65/80; H04L 65/602; H04N 21/23406; H04N 21/4384
USPC .................. 709/231–232, 227–228
See application file for complete search history.

(56) References Cited

U.S. PATENT DOCUMENTS

| 5,414,455 A * | 5/1995 | Hooper | H04N 7/17318 |
| | | | 348/E7.071 |
| 7,194,563 B2 * | 3/2007 | Plourde, Jr. | H04N 21/4334 |
| | | | 348/E5.007 |
| 8,390,669 B2 * | 3/2013 | Catchpole | G06K 9/00288 |
| | | | 709/231 |
| 8,867,524 B1 | 10/2014 | Croak et al. | |
| 8,881,029 B2 | 11/2014 | Thapa | |
| 8,933,941 B2 * | 1/2015 | Emerson | H04N 21/4334 |
| | | | 345/502 |
| 9,451,231 B1 * | 9/2016 | Hundemer | H04N 9/87 |
| 9,467,652 B2 | 10/2016 | Mande et al. | |
| 9,665,570 B2 | 5/2017 | Chee et al. | |
| 2008/0294721 A1 | 11/2008 | Berndt et al. | |
| 2009/0220066 A1 | 9/2009 | Shaffer et al. | |
| 2010/0277565 A1 | 11/2010 | Edet | |
| 2011/0179180 A1 * | 7/2011 | Schleifer | H04L 12/1818 |
| | | | 709/227 |

(Continued)

FOREIGN PATENT DOCUMENTS

WO WO 2008/139495 A2 11/2008

*Primary Examiner* — Bharat Barot
(74) *Attorney, Agent, or Firm* — Finnegan, Henderson, Farabow, Garrett & Dunner, LLP

(57) ABSTRACT

The present disclosure relates to systems and methods for providing a video stream to one or more communication sessions. In one implementation, the system may include a video recording device, a memory storing instructions, and a processor configured to execute the instructions. The instructions may comprise instructions to activate the video recording device and receive a video stream therefrom, buffer the video stream in an allocated portion of the memory, allow access to the buffered video stream for use in a first communications session, continue buffering the video stream after the buffered video stream has been accessed for use in the first communications session, and allow access to the buffered video stream for use in a second communications session.

20 Claims, 8 Drawing Sheets

(56) References Cited

U.S. PATENT DOCUMENTS

| | | | |
|---|---|---|---|
| 2011/0271212 A1 | 11/2011 | Jones et al. | |
| 2011/0296046 A1* | 12/2011 | Arya | H04L 65/602 |
| | | | 709/231 |
| 2015/0350335 A1* | 12/2015 | Zhang | H04L 65/601 |
| | | | 709/228 |
| 2016/0048841 A1 | 2/2016 | Johnson et al. | |
| 2017/0156093 A1* | 6/2017 | Bhumkar | H04W 36/08 |

* cited by examiner

SYSTEMS AND METHODS FOR PROVIDING SHARED MEMORY POINTERS TO A PERSISTENT VIDEO STREAM FOR USE IN A VIDEO COMMUNICATIONS SESSION

TECHNICAL FIELD

The present disclosure relates generally to the field of audio or video conferencing. More specifically, and without limitation, this disclosure relates to systems and methods for enabling continuous use of a stream in a communications session.

BACKGROUND

Generally, when a participant initiates or joins a communications session, such as an audio and/or video conference, there is a lag between when a computer program managing the communications session powers on a video (and/or audio) recording device and receives the video (and/or audio) stream therefrom. Accordingly, initiating or joining a communications session is usually perceptibly non-instantaneous.

Furthermore, if a participant pauses a first communications session and then resumes it, there is generally a similar lag, resulting in a perceptible delay in the connection and participation. Switching from a first communications session to a second communications session may result in a similar lag. Extant systems usually rely on increasing processor and/or network speeds to reduce lag. However, even with increased processor speeds and/or network speeds, such lag may remain noticeable and the connection and participation is perceptibly non-instantaneous.

SUMMARY

In view of the foregoing, embodiments of the present disclosure provide systems and methods for enabling a persistent video stream for use in a video communications session. Such systems and methods are configured to reduce the lag discussed above and may do so such that any remaining lag is imperceptible, allowing a participant to perceive instantaneity in connection and participation in video communications.

According to an example embodiment of the present disclosure, a system for providing a video stream to one or more communication sessions, the system may comprise a video recording device; a memory storing instructions; and a processor configured to execute the instructions. The instructions may comprise instructions to activate the video recording device and receive a video stream therefrom, buffer the video stream in an allocated portion of the memory, and allow access to the buffered video stream for use in a first communications session. The instructions may further comprise instructions to continue buffering the video stream after the buffered video stream has been accessed for use in the first communications session and allow access to the buffered video stream for use in a second communications session.

In some embodiments, the instructions may comprise a computer program distinct from one or more computer programs managing the first communications session and the second communications session. In other embodiments, the instructions may comprise at least a portion of a computer program distinct that also manages at least one of the first communications session and the second communications session.

In some embodiments, the allocated portion of the memory may be distinct from a portion of the memory storing one or more computer programs managing the first communications session and the second communications session.

In some embodiments, allowing access to the buffered video stream may comprise providing a pointer reference to the allocated portion of the memory to which the video stream is buffered.

In some embodiments, the buffered video stream may be uncompressed. In other embodiments, the instructions may further comprise instructions to compress the received video stream using at least one codec. In such embodiments, the buffered video stream may be compressed. In some embodiments, the at least one codec may be selected based on one or more computer programs managing at least one of the first communications session and the second communications session.

In some embodiments, the system may further comprise an audio recording device. In such embodiments, the instructions may further comprise instructions to activate the audio recording device and receive an audio stream therefrom. For example, the audio recording device may be activated when at least one of the first communications session and the second communications session are started. In addition, the instructions may further comprise instructions to buffer the audio stream in a second allocated portion of the memory and allow access to the buffered audio stream for use in at least one of the first communications session and the second communications session.

In some embodiments, the instructions may further comprise instructions to continue buffering the video stream after at least one of the first communications session and the second communications session are paused. In such embodiments, the instructions may further comprise instructions to allow access to the buffered video stream for use in the one or more paused communications sessions when resumed.

According to another example embodiment of the present disclosure, a method for providing a video stream to one or more communication sessions may comprise activating a video recording device and receiving a video stream therefrom; buffering the video stream in an allocated portion of a memory; and allowing access to the buffered video stream for use in a first communications session. The method may further comprise continue buffering the video stream after the buffered video stream has been accessed for use in the first communications session and allowing access to the buffered video stream for use in a second communications session.

In some embodiments, allowing access to the buffered video stream comprises providing a pointer reference to the allocated portion of the memory to which the video stream is buffered.

In some embodiments, the method may further comprise compressing the received video stream using at least one codec. In such embodiments, the buffered video stream may be compressed, and the at least one codec may be selected based on one or more computer programs managing at least one of the first communications session and the second communications session.

According to a third example embodiment of the present disclosure, a non-transitory computer-readable medium may store instructions that, when executed by one or more processors, cause the one or more processors to activate a video recording device and receiving a video stream therefrom; buffer the video stream in an allocated portion of a memory; and allow access to the buffered video stream for use in a first communications session. The instructions may further cause the one or more processors to continue buffering the video stream after the buffered video stream has been accessed for use in the first communications session and allow access to the buffered video stream for use in a second communications session.

In some embodiments, the instructions may comprise a computer program distinct from one or more computer programs managing the first communications session and the second communications session. In other embodiments, the instructions may comprise at least a portion of a computer program distinct that also manages at least one of the first communications session and the second communications session.

It is to be understood that the foregoing general description and the following detailed description are example and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

The disclosed embodiments relate to systems and methods for providing a video stream to one or more communication sessions. Embodiments of the present disclosure may be implemented using a general-purpose computer. Alternatively, a special-purpose computer may be built according to embodiments of the present disclosure using suitable logic elements.

Advantageously, disclosed embodiments allow for providing a persistent video stream to one or more communication sessions. Accordingly, embodiments of the present disclosure allow for reducing lag when initiating or resuming a first communications session and/or switching from a first communications session to a second communications session, which may result in the initiation, resumption, and/or switching being perceived as instantaneous by a participant.

According to an aspect of the present disclosure, a communications session may be initiated by a participant (sometimes referred to as the "host") and joined by a plurality of other participants. In some embodiments, the conference session may be audio only, video only, or both.

Figure 8:
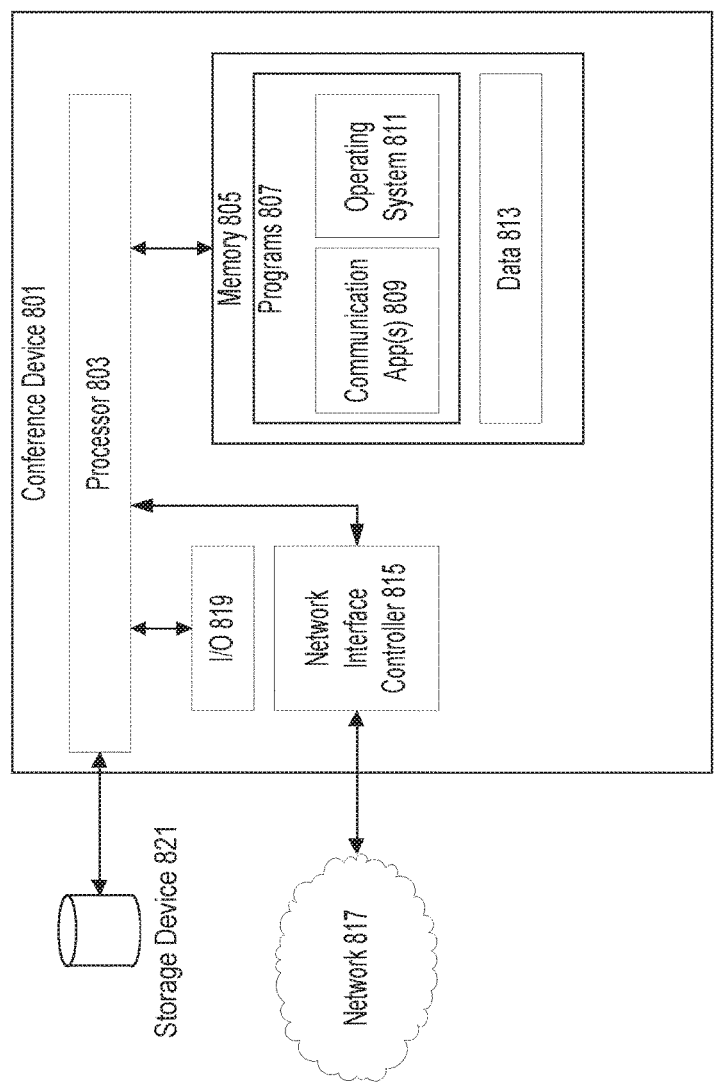
FIG. 8 is a block diagram of an example user interface device with which the systems, methods, and apparatuses of the present invention may be implemented.

Each of the plurality of participants may use one or more user interface devices to connect to the communications session. For example, a user interface device may comprise a laptop computer, a desktop computer, a smartphone, a tablet, or any other device capable of receiving audio and/or video and transmitting it to a collaboration server. An example user interface device 800 is depicted in FIG. 8.

In certain aspects, a plurality of participants may share one or more user interface devices. For example, a plurality of participants may connect to the communications session using a single computer within a conference room. Alternatively, a participant may use a user interface device without sharing. For example, a participant may use a tablet or a smartphone for connecting to the communications session.

In certain aspects, the user interface device may include at least one processor. For example, the at least one processor may comprise a central processing unit (CPU), a graphics processing unit (GPU), a field programmable gate array (FPGA), or a systems on a chip (SoC), or other device capable of executing stored instructions.

Additionally, the user interface device may include at least one memory. For example, the at least one memory may comprise volatile memory, such as a random access memory (such as static RAM (SRAM), dynamic RAM (DRAM), etc.), a read-only memory (such as erasable programmable read-only memory (EPROM), electrically erasable programmable read-only memory (EEPROM), etc.), or the like, and/or non-volatile memory, such as a hard disk drive, a flash memory, or the like. In some embodiments, the user interface may include a combination of memories, e.g., a non-volatile memory storing one or more sets of instructions and other data coupled with a volatile memory storing currently executed instructions and other data.

In some embodiments, the user interface device may include one or more video recording devices. For example, a video recording device may comprise a camera or other image sensor (or transducer) that detects light waves and generates analog and/or digital signals that constitute an image of the light waves. A series of images (referred to as "frames") comprise a video.

In some embodiments, the user interface device may include one or more audio recording devices. For example, an audio recording device may comprise a microphone or other audio sensor (or transducer) that converts audio waves to analog and/or digital signals that represent the audio waves. In certain aspects, the analog and/or digital signals (e.g., in the form of an audio stream or audio file) may be associated with a video.

According to an aspect of the present disclosure, at least one processor (e.g., of the user interface device) may activate a recording device (e.g., of the user interface device). For example, the processor may activate one or more switches that permit power to be provided to the recording device. Alternatively or concurrently, the processor may generate an analog and/or digital signal that instructs the recording device to begin recording and may send the generated signal to the recording device. Upon activation of the recording device, the processor may receive a stream therefrom.

In embodiments having both a video recording device and an audio recording device, the processor may activate the audio recording device concurrently with (or immediately prior to activating or immediately after activating) the video recording device. Alternatively, the processor may activate the audio recording device prior to activating the video recording device or after activating the video recording device.

In some embodiments, the processor may buffer the stream in an allocated portion of a memory (e.g., of the user interface device). For example, the processor may allocate a particular number of blocks from a heap or a free store of the memory and then buffer the stream using the allocated blocks. In certain aspects, the allocation of the blocks may be performed using chunking in order to lessen (or even eliminate) fragmentation of the allocated blocks.

In some embodiments, the allocation may be fixed. For example, the processor may allocate a particular number of blocks and buffer the stream to the blocks without allowing the stream to exceed the allocated blocks. In such an example, the processor may delete the oldest portion of the buffered stream when the allocated blocks are full (or exceeding a capacity threshold, such as 90%, 80%, etc., or 100 MB, 50 MB, etc.) to allow storing the newest portion of the buffered stream. Accordingly, the processor may implement loop recording.

In other embodiments, the allocation may be variable. For example, the processor may use slab allocation such that the cache used to buffer the stream may expand and/or shrink. In such an example, the cache may expand and/or shrink based on capacity thresholds, as explained above. The processor may also implement loop recording in conjunction with slab allocation.

In some embodiments, the allocated portion of the memory may comprise one or more blocks of one or more volatile memories, which may increase a speed of access to the allocated portion. Alternatively or concurrently, the allocated portion of the memory may comprise one or more sectors of one or more non-volatile memories, which may allow for the use of a virtual memory to buffer the stream.

In some embodiments, the stream may be buffered to the allocated portion in an uncompressed format. Alternatively, the processor may compress the received stream using at least one codec such that the buffered stream is compressed. For example, in embodiments where the stream is a video stream, the processor may use a lossy codec, such as MPEG-2 Part 2, MPEG-4 Part 2, H.264 (MPEG-4 Part 10), HEVC, Theora, RealVideo RV40, VP9, AV1, or the like, or a lossless codec, such a Dirac or the like. Similarly, in embodiments where the stream is an audio stream, the processor may use a lossy codec, such as AAC or the like, or a lossless codec, such a FLAC or the like.

In embodiments where the processor receives an audio stream and a video stream, the processor may buffer the audio stream to the same allocated portion and/or to a different allocated portion as the video stream.

In embodiments with compressed video and/or compressed audio, the codec used to compress the video stream and/or the codec used to compress the audio stream may be selected based on one or more computer programs managing a first communications session and/or one or more computer programs managing a second communications session, as described below. For example, if the one or more computer programs managing the first communications session and/or the second communications session usually streams video and/or audio in one or more particular formats, the processor may select one or more corresponding codecs such that the video and/or audio is buffered in one or more of the particular formats.

In some embodiments, the processor may allow access to the buffered stream for use in a first communications session. For example, the first communications session may be managed by one or more computer programs executed on the processor (and/or another processor of, e.g., the user interface device). In certain aspects, the instructions to buffer the stream to the allocated portion of memory may comprise at least a portion of a computer program distinct from the one or more computer programs managing the first communications session. Alternatively or concurrently, the instructions to buffer the stream to the allocated portion of memory may comprise at least a portion of the one or more computer programs managing the first communications session.

Similarly, the allocated portion of the memory may be distinct from a portion of the memory storing one or more computer programs managing the first communications session. Alternatively, at least a portion of the allocated portion may be a portion of the memory managed by the one or more computer programs managing the first communications session.

In some embodiments, the processor may allow access to the buffered stream by providing the stream (whether uncompressed or compressed) to the one or more computer programs managing the first communications session. In other embodiments, the processor may allow access by providing a pointer (or other reference) to the allocated portion of the memory to which the stream is buffered. For example, the pointer may comprise a memory address or other indicator of the location of the stream in the memory.

In certain aspects, the pointer may comprise a mutable pointer (e.g., a pointer as used in C, C++, and similar programming languages) such that the pointer itself may be directly manipulated in addition to the data to which it points. Alternatively, the pointer may comprise an immutable pointer (e.g., a reference as used in C++ and similar programming languages) such that the pointer may not be directly manipulated, only the data to which it points.

In embodiments where the processor receives an audio stream and a video stream, the processor may allow access to the buffered audio stream for use in the first communications session in the same manner as allowing access to the buffered video stream or in a different manner. For example, the processor may provide the audio stream and/or provide a pointer (or other reference) to the allocated portion of the memory to which the audio stream is buffered, as described above.

In some embodiments, the processor may continue buffering the stream after the buffered stream has been accessed for use in the first communications session. For example, the processor may continue buffering the stream even as the one or more computer programs managing the first communications session access the already-buffered stream from the allocated portion.

In some embodiments, the processor may allow access to the buffered stream for use in a second communications session. For example, the second communications session may be managed by one or more computer programs executed on the processor (and/or another processor of, e.g., the user interface device). At least one of the one or more computer programs may be the same program(s) managing the first communications session. Alternatively, the one or more computer programs may be different from the program(s) managing the first communications session.

As explained above, the processor may allow access to the buffered stream by providing the stream (whether uncompressed or compressed) and/or providing a pointer (or other reference) to the allocated portion of the memory to which the stream is buffered. For example, the pointer may comprise a mutable pointer or an immutable pointer.

In embodiments where the processor receives an audio stream and a video stream, the processor may allow access to the buffered audio stream for use in the second communications session in the same manner as allowing access to the buffered video stream or in a different manner. For example, the processor may provide the audio stream and/or provide a pointer (or other reference) to the allocated portion of the memory to which the audio stream is buffered, as described above.

In certain aspects, the instructions to buffer the stream to the allocated portion of memory may comprise at least a portion of a computer program distinct from the one or more computer programs managing the second communications session. Alternatively or concurrently, the instructions to buffer the stream to the allocated portion of memory may comprise at least a portion of the one or more computer programs managing the second communications session.

Similarly, the allocated portion of the memory may be distinct from a portion of the memory storing one or more computer programs managing the second communications session. Alternatively, at least a portion of the allocated portion may be a portion of the memory managed by the one or more computer programs managing the second communications session.

In some embodiments, the first communications session and/or the second communications session may be paused. In such embodiments, the processor may continue buffering the stream after at least one of the first communications session and the second communications session are paused. Accordingly, the buffer of the stream in the allocated portion may continue to be updated even if the first communications session and/or the second communications session are paused. In embodiments where the processor receives an audio stream and a video stream, the processor may continue buffering the video stream and the audio stream after at least one of the first communications session and the second communications session are paused.

After being paused, the first communications session and/or the second communications session may be resumed. In such embodiments, the processor may allow access to the buffered stream for use in the one or more paused communications sessions when resumed. Accordingly, the one or more programs managing the first communications session and/or the second communications may access the updated buffered stream from the allocated portion upon resuming. In embodiments where the processor receives an audio stream and a video stream, the processor may allow access to the buffered audio stream and the buffered video stream for use in the one or more paused communications sessions when resumed.

Figure 1:
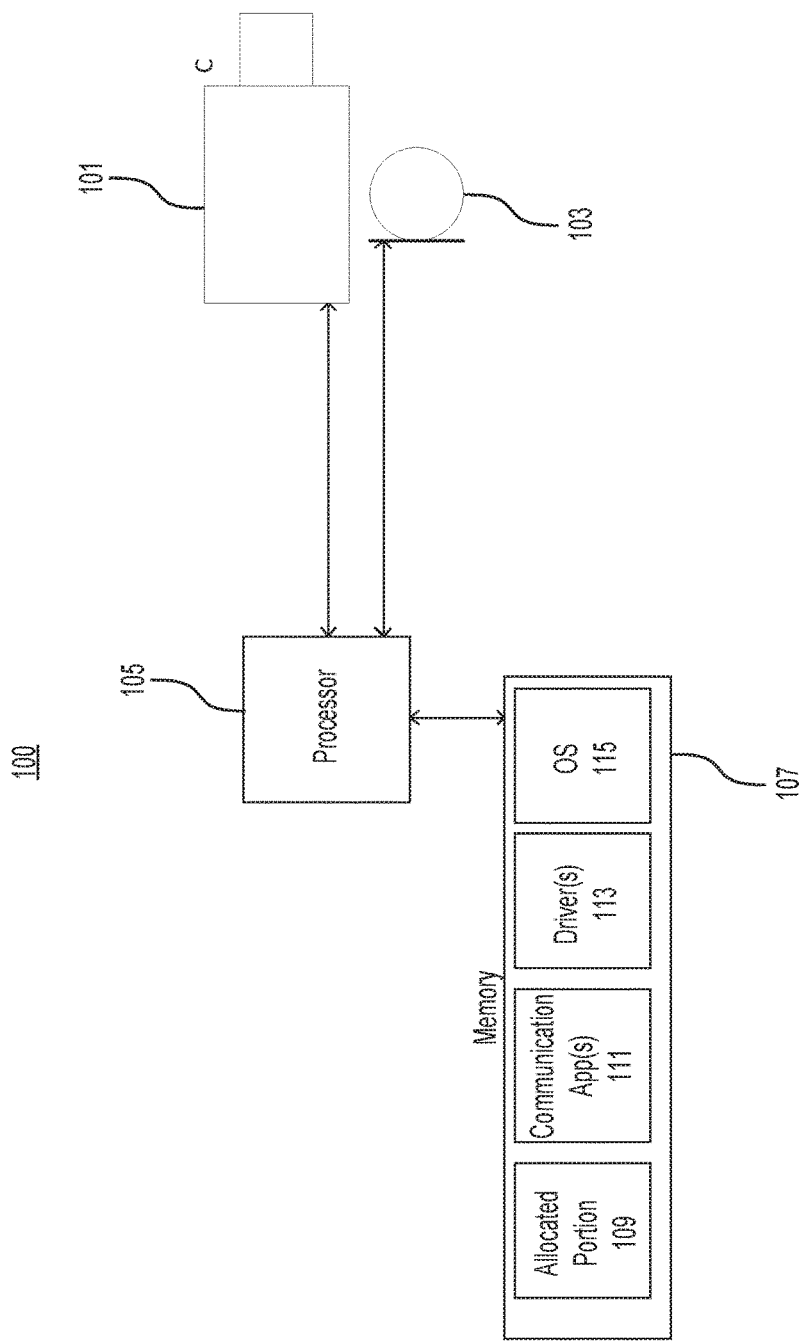
FIG. 1 is a block diagram of an example system for providing a persistent video stream for use in a video communications session, according to an example embodiment of the present disclosure.

Turning now to FIG. 1, there is shown a system 100 for providing a persistent stream for use in a communications session. As depicted in FIG. 1, system 100 may include a video recording device 101. For example, the video recording device may comprise a camera or other image sensor (or transducer) that detects light waves and generates analog and/or digital signals that constitute an image of the light waves. At least one of video recording device 101 (or a processor therein) and processor 105 of system 100 (described below) may construct a video from a series of images captured by video recording device 101.

In the embodiment depicted in FIG. 1, system 100 may include an audio recording device 103. For example, the audio recording device may comprise a microphone or other audio sensor (or transducer) that converts audio waves to analog and/or digital signals that represent the audio waves. In certain aspects, at least one of video recording device 101 (or a processor therein), audio recording device 103 (or a processor therein), and processor 105 of system 100 (described below) may associate an audio recording from audio recording device 103 with a video from video recording device 101.

As further depicted in FIG. 1, system 100 may include a processor 105 and a memory 107. Although depicted as a single processor in FIG. 1, processor 105 may include a plurality of processors. Similarly, although depicted as a single memory in FIG. 1, memory 107 may include a plurality of memories. Memory 107 may be volatile memory and/or non-volatile memory. In some embodiments, memory 107 may include a pagefile, swap partition, or other allocation such that a non-volatile portion of memory 107 may function as volatile memory.

Processor 105 may communicate with video recording device 101 and/or audio recording device 103. For example, processor 105 may receive analog and/or digital signals representing video and/or audio along a bus or other communications connection. Alternatively or concurrently, memory 107 may receive analog and/or digital signals from video recording device 101 and/or audio recording device 103.

As further depicted in FIG. 1, memory 107 may store an allocated portion 109 for receiving and buffering a video stream from video recording device 101 (and/or audio stream from audio recording device 103). Although depicted as a single portion, allocated portion 109 may comprise a plurality of portions (or sectors) of memory 107. In embodiments where memory 107 comprises a plurality of memories, allocated portion 109 may comprise a plurality of portions (or sectors) distributed amongst the plurality of memories. For example, if memory 107 comprises a volatile memory and a non-volatile memory having a pagefile, swap partition, or the like, allocated portion 109 may include a portion of the volatile memory and a portion of the pagefile, swap partition, etc.

Memory 107 may further store one or more communication applications 111. For example, the one or more communication applications 111 may manage one or more communications sessions. As explained above, the buffered video stream (and/or audio stream) in allocated portion 109 may be available to the one or more communication applications 111 for use in one or more communications sessions.

In some embodiments, memory 107 may further store one or more drivers 113. For example, the one or more drivers 113 may enable communications between memory 113 (and/or processor 105) and video recording device 101 (and/or audio recording device 103). In such embodiments, the one or more drivers 113 may receive analog and/or digital signals from video recording device 101 (and/or audio recording device 103) and then transmit the received signals to at least one of memory 107 and processor 105.

In some embodiments, memory 107 may further store an operating system 115. For example, operating system 115 may comprise Windows, OS X, Linux, or other software that manages resources and provides common services for computer programs (such as the one or more communication applications 111). In embodiments where the operating system 115 comprises Windows, memory 107 may include a pagefile on a non-volatile memory, and/or the one or more drivers 113 may be separate from operating system 115 and configured to execute in user mode or in kernel mode. In embodiments where the operating system 115 comprises Linux, OS X, or other Unix-based software, memory 107 may include a swap partition on a non-volatile memory, and/or the one or more drivers 113 may form a portion of the kernel of operating system 115. Accordingly, although depicted as separate in FIG. 1, the one or more drivers 113 may form a portion of operating system 115.

Figure 2:
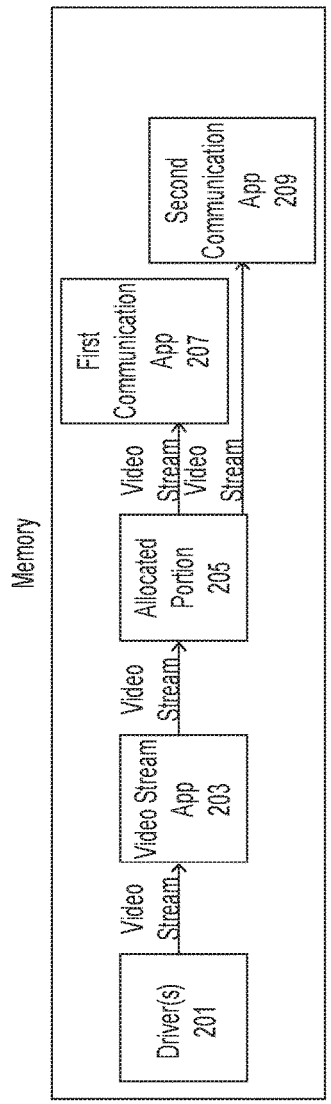
FIG. 2 is a diagram of an example memory for buffering and allowing access to a persistent video stream for use in a video communications session, according to an example embodiment of the present disclosure.

FIG. 2 depicts an example memory 200 for buffering and allowing access to a persistent video stream for use in a communications session. For example, memory 200 may comprise at least a portion of memory 107 of system 100 of FIG. 1. Although depicted and described with a video stream, memory 200 may instead buffer and allow access to a persistent audio stream for use in a communications session.

Although depicted as a single memory in FIG. 2, memory 200 may comprise a plurality of memories in communicative connection with each other. Moreover, memory 200 may be volatile memory and/or non-volatile memory. In some embodiments, memory 200 may include a pagefile, swap partition, or other allocation such that a non-volatile portion of memory 200 may function as volatile memory.

As depicted in FIG. 2, memory 200 may store one or more drivers 201. For example, the one or more drivers 201 may receive a video stream from a video recording device or otherwise facilitate the transmission of the video stream form the video recording device to memory 200.

Although not depicted in FIG. 2, the one or more drivers 201 may alternatively or concurrently receive an audio stream from an audio recording device or otherwise facilitate the transmission of the audio stream form the audio recording device to memory 200. Although depicted as standalone in FIG. 2, at least one of the one or more drivers 201 may form a portion of an operating system in memory 200.

As further depicted in FIG. 2, memory 200 may store a stream application 203. For example, stream application 203 may comprise instructions to receive the video stream from the video recording device (and/or from or using the one or more drivers 201) and buffer the video stream to allocated portion 205. Alternatively or concurrently, stream application 203 may comprise instructions to receive the audio stream from the audio recording device (and/or from or using the one or more drivers 201).

In some embodiments, allocated portion 205 may comprise a particular number of blocks from a heap or a free store of memory 200. In certain aspects, the allocated portion 205 may be chunked in order to lessen (or even eliminate) fragmentation of allocated portion 205. In certain aspects, the size of allocated portion 205 may be fixed. In some embodiments, the stream may be buffered as a loop recording. For example, the oldest portion of the buffered stream in allocated portion 205 may be deleted when the allocated blocks are full (or exceeding a capacity threshold, such as 90%, 80%, etc., or 100 MB, 50 MB, etc.), and the newest portion of the buffered stream may then be stored in allocated portion 205.

In other embodiments, the size of allocated portion 205 may be variable. For example, allocated portion 205 may be slab allocated such that one or more caches of allocated portion 205 may expand and/or shrink. In such an example, the one or more caches may expand and/or shrink based on capacity thresholds, as explained above. In some embodiments, the stream may be buffered as a loop recording, as explained above.

Stream application 203 may allow a first communications application 207 and/or a second communications application 209 access to the buffered stream from allocated portion 205. For example, as depicted in FIG. 2, the buffered stream may be directly provided to first communications application 207 and/or second communications application 209.

In embodiments where memory 200 includes a buffered video stream and a buffered audio stream, memory 200 may include another allocated portion (not depicted) for the audio stream separate from allocated portion 205.

Figure 3:
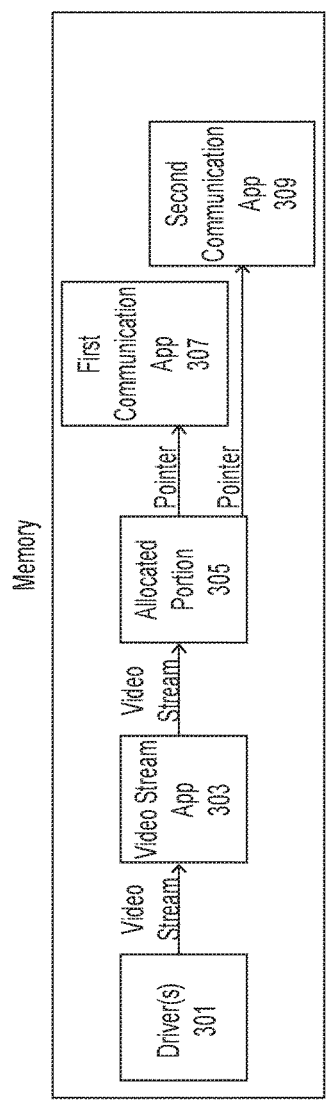
FIG. 3 is a diagram of another example memory for buffering and allowing access to a persistent video stream for use in a video communications session, according to an example embodiment of the present disclosure.

FIG. 3 depicts an example memory 300 for buffering and allowing access to a persistent video stream for use in a video communications session. For example, memory 300 may comprise at least a portion of memory 107 of system 100 of FIG. 1. Although depicted and described with a video stream, memory 300 may instead buffer and allow access to a persistent audio stream for use in a communications session.

Although depicted as a single memory in FIG. 3, memory 300 may comprise a plurality of memories in communicative connection with each other. Moreover, memory 300 may be volatile memory and/or non-volatile memory. In some embodiments, memory 300 may include a pagefile, swap partition, or other allocation such that a non-volatile portion of memory 300 may function as volatile memory.

As depicted in FIG. 3, memory 300 may store one or more drivers 302 that form a portion of operating system 301. For example, the one or more drivers 302 may receive a video stream from a video recording device or otherwise facilitate the transmission of the video stream form the video recording device to memory 300.

Although not depicted in FIG. 3, the one or more drivers 302 may alternatively or concurrently receive an audio stream from an audio recording device or otherwise facilitate the transmission of the audio stream form the audio recording device to memory 300. Although depicted as a portion of operating system 301 in FIG. 3, at least one of the one or more drivers 302 may be separate from operating system 301.

As further depicted in FIG. 3, memory 300 may store a stream application 303. For example, stream application 303 may comprise instructions to receive the video stream from the video recording device (and/or from or using the one or more drivers 302) and buffer the video stream to allocated portion 305. Alternatively or concurrently, stream application 303 may comprise instructions to receive the audio stream from the audio recording device (and/or from or using the one or more drivers 302).

In some embodiments, allocated portion 305 may comprise a particular number of blocks from a heap or a free store of memory 300. In certain aspects, the allocated portion 305 may be chunked in order to lessen (or even eliminate) fragmentation of allocated portion 305. In certain aspects, the size of allocated portion 305 may be fixed. In some embodiments, the stream may be buffered as a loop recording. For example, the oldest portion of the buffered stream in allocated portion 305 may be deleted when the allocated blocks are full (or exceeding a capacity threshold, such as 90%, 80%, etc., or 100 MB, 50 MB, etc.), and the newest portion of the buffered stream may then be stored in allocated portion 305.

In other embodiments, the size of allocated portion 305 may be variable. For example, allocated portion 305 may be slab allocated such that one or more caches of allocated portion 305 may expand and/or shrink. In such an example, the one or more caches may expand and/or shrink based on capacity thresholds, as explained above. In some embodiments, the stream may be buffered as a loop recording, as explained above.

Stream application 303 may allow a first communications application 307 and/or a second communications application 309 access to the buffered stream from allocated portion 305. For example, as depicted in FIG. 3, stream application 303 may provide a pointer (or other reference) to allocated portion 305. For example, the pointer may comprise a memory address or other indicator of the location of the stream in the memory. In certain aspects, the pointer may comprise a mutable pointer. Alternatively, the pointer may comprise an immutable pointer.

In embodiments where memory 300 includes a buffered video stream and a buffered audio stream, memory 300 may include another allocated portion (not depicted) for the audio stream separate from allocated portion 305.

Figure 4:
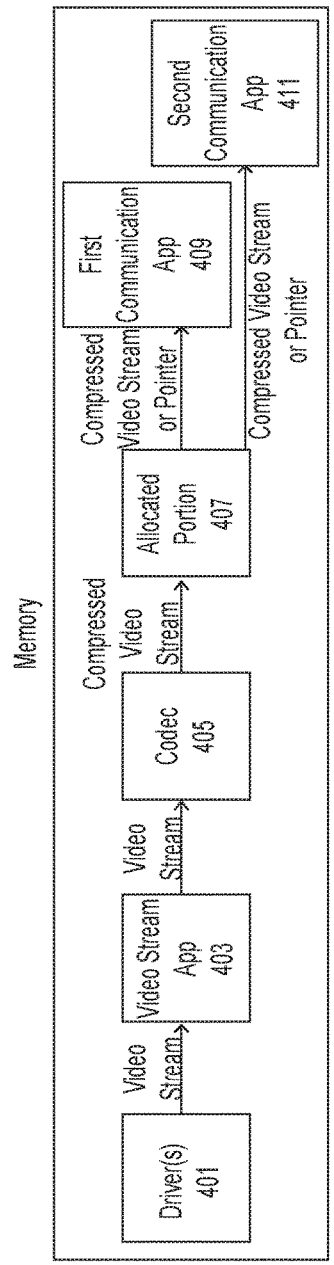
FIG. 4 is a diagram of example memories for buffering and allowing access to a persistent video stream for use in a video communications session, according to an example embodiment of the present disclosure.

FIG. 4 depicts example memories 400 and 410 for buffering and allowing access to a persistent video stream for use in a video communications session. Although depicted as two memories in FIG. 4, a single memory or more than two memories in communicative connection with each other may be used instead. Moreover, memory 400 and memory 410 may independently be chosen from volatile memories and non-volatile memories. For example, memory 400 may comprise a volatile memory such as a RAM, and memory 410 may comprise a non-volatile memory such as a hard disk having a pagefile, swap partition, or other allocation such that at least a portion of memory 410 may function as a volatile memory. Although depicted and described with a video stream, memories 400 and 410 may instead buffer and allow access to a persistent audio stream for use in a communications session.

As depicted in FIG. 4, one or more drivers 401, video stream application 403, codec 405, and allocated portion 407 reside on memory 400 while first communications application 409 and second communications application 411 reside on memory 410. However, other embodiments are possible. For example, any of the components depicted in FIG. 4 may reside separately from any other components, and any of the components depicted in FIG. 4 may reside together with any other components. Moreover, any of the components depicted in FIG. 4 may be divided amongst a plurality a memories. For example, allocated portion 407 may reside, in part, on memory 400 and, in part, on memory 410.

In the example of FIG. 4, the one or more drivers 401 may receive a video stream from a video recording device or otherwise facilitate the transmission of the video stream form the video recording device to memory 400 (and/or to memory 410).

Although not depicted in FIG. 4, the one or more drivers 401 may alternatively or concurrently receive an audio stream from an audio recording device or otherwise facilitate the transmission of the audio stream form the audio recording device to memory 400 (and/or to memory 410). Although depicted as standalone in FIG. 4, at least one of the one or more drivers 401 may form a portion of an operating system (not shown) in memory 400 (and/or in memory 410).

As further depicted in FIG. 4, stream application 403 may comprise instructions to receive the video stream from the video recording device (and/or from or using the one or more drivers 401) and compress the video stream using codec 405. For example, codec 405 may be selected because the output thereof is compatible with first communications application 409 and/or second communications application 411. Alternatively or concurrently, stream application 403 may comprise instructions to receive the audio stream from the audio recording device (and/or from or using the one or more drivers 401).

Stream application 403 may direct the compressed video stream (and/or audio stream) to allocated portion 407. In some embodiments, allocated portion 407 may comprise a particular number of blocks from a heap or a free store of memory 400 (and/or memory 410). In certain aspects, the allocated portion 407 may be chunked in order to lessen (or even eliminate) fragmentation of allocated portion 407. In certain aspects, the size of allocated portion 407 may be fixed. In some embodiments, the compressed stream may be buffered as a loop recording. For example, the oldest portion of the buffered stream in allocated portion 407 may be deleted when the allocated blocks are full (or exceeding a capacity threshold, such as 90%, 80%, etc., or 100 MB, 50 MB, etc.), and the newest portion of the buffered stream may then be stored in allocated portion 407.

In other embodiments, the size of allocated portion 407 may be variable. For example, allocated portion 407 may be slab allocated such that one or more caches of allocated portion 407 may expand and/or shrink. In such an example, the one or more caches may expand and/or shrink based on capacity thresholds, as explained above. In some embodiments, the compressed stream may be buffered as a loop recording, as explained above.

Video stream application 403 may allow a first communications application 409 and/or a second communications application 411 access to the buffered stream from allocated portion 407. For example, as depicted in FIG. 4, video stream application 403 may provide a pointer (or other reference) to allocated portion 407 and/or may provide the compressed stream directly to first communications application 409 and/or second communications application 411.

In embodiments where memory 400 (and/or memory 410) includes a buffered video stream and a buffered audio stream, memory 400 (and/or memory 410) may include another allocated portion (not depicted) for the audio stream separate from allocated portion 407.

FIG. 55 depicts an example memory 500 for buffering and allowing access to a persistent video stream for use in a communications session. For example, memory 500 may comprise at least a portion of memory 107 of system 100 of FIG. 1.

Figure 5:
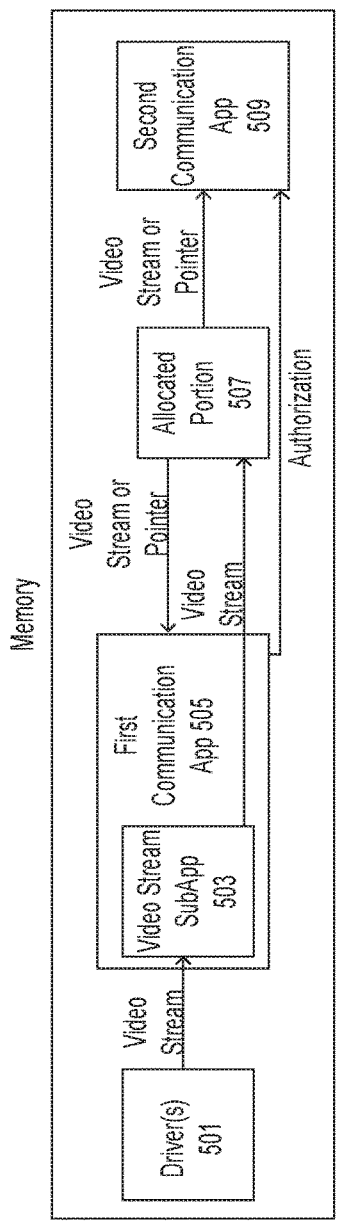
FIG. 5 is a diagram of a fourth example memory for buffering and allowing access to a persistent video stream for use in a video communications session, according to an example embodiment of the present disclosure.

Although depicted as a single memory in FIG. 5, memory 500 may comprise a plurality of memories in communicative connection with each other. Moreover, memory 500 may be volatile memory and/or non-volatile memory. In some embodiments, memory 500 may include a pagefile, swap partition, or other allocation such that a non-volatile portion of memory 500 may function as volatile memory.

As depicted in FIG. 5, memory 500 may store one or more drivers 501. For example, the one or more drivers 501 may receive a video stream from a video recording device or otherwise facilitate the transmission of the video stream from the video recording device to memory 500. Additionally, as depicted in FIG. 5, the one or more drivers 501 may receive an audio stream from an audio recording device or otherwise facilitate the transmission of the audio stream form the audio recording device to memory 500. Although depicted as standalone in FIG. 5, at least one of the one or more drivers 501 may form a portion of an operating system (not shown) in memory 500.

As further depicted in FIG. 5, memory 500 store a video stream subapplication 503 that forms a portion of a first communications application 505. For example, video stream subapplication 503 may comprise instructions to receive the video stream from the video recording device (and/or from or using the one or more drivers 501) and buffer the video stream to allocated portion 507. In addition, video stream subapplication 503 may comprise instructions to receive the audio stream from the audio recording device (and/or from or using the one or more drivers 501) and buffer the audio stream to allocated portion 507. Although depicted as the same allocated portion in FIG. 5, the video stream and the audio stream may be buffered to separate allocated portions.

In some embodiments, allocated portion 507 may comprise a particular number of blocks from a heap or a free store of memory 500. In certain aspects, the allocated portion 507 may be chunked in order to lessen (or even eliminate) fragmentation of allocated portion 507. In certain aspects, the size of allocated portion 507 may be fixed. In some embodiments, the video stream and/or audio stream may be buffered as a loop recording. For example, the oldest portion of the buffered video stream and/or audio stream in allocated portion 507 may be deleted when the allocated blocks are full (or exceeding a capacity threshold, such as 90%, 80%, etc., or 100 MB, 50 MB, etc.), and the newest portion of the buffered video stream and/or audio stream may then be stored in allocated portion 507.

In other embodiments, the size of allocated portion 507 may be variable. For example, allocated portion 507 may be slab allocated such that one or more caches of allocated portion 507 may expand and/or shrink. In such an example, the one or more caches may expand and/or shrink based on capacity thresholds, as explained above. In some embodiments, the video stream and/or audio stream may be buffered as a loop recording, as explained above.

Video stream subapplication 503 may allow the first communications application 505 access to the buffered video stream and/or audio stream from allocated portion 507. In addition, as depicted in FIG. 5, video stream subapplication 503 (and/or first communications application 505) may allow (e.g., provide an authorization to access, such as a private key or the like) a second communications application 509 access to the buffered video stream and/or audio stream from allocated portion 507. For example, as depicted in FIG. 5, second communications application 509 may receive a pointer (or other reference) to allocated portion 507 and/or may receive the buffered video stream and/or audio stream directly based on the authorization.

In some embodiments, first communications application 505 and second communications application 509 may access the buffered video stream and/or audio stream in different ways. For example, first communications application 505 may receive the buffered video stream and/or audio stream directly from video stream subapplication 503 while second communications application 509 may receive a pointer to allocated portion 507 from video stream subapplication 503 (and/or from first communications application 505), or vice versa.

FIG. 66 depicts an example memory 600 for buffering and allowing access to a persistent video stream for use in a video communications session. For example, memory 600 may comprise at least a portion of memory 107 of system 100 of FIG. 1.

Figure 6:
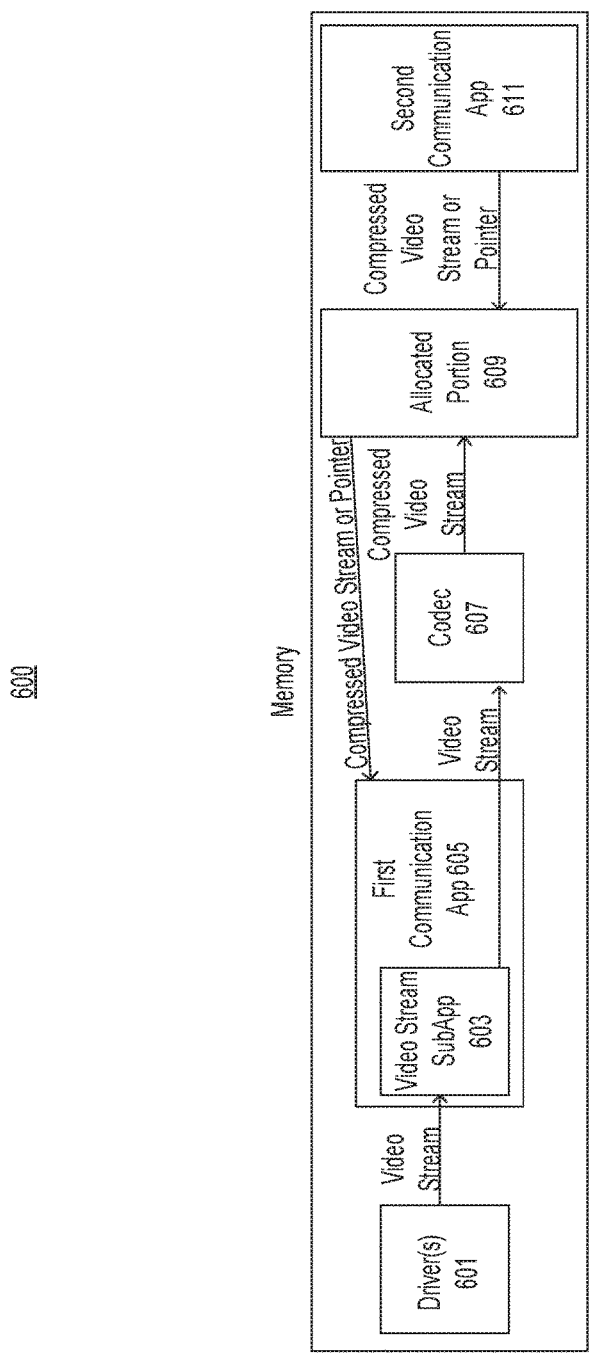
FIG. 6 is a diagram of a fifth example memory for buffering and allowing access to a persistent video stream for use in a video communications session, according to an example embodiment of the present disclosure.

Although depicted as a single memory in FIG. 6, memory 600 may comprise a plurality of memories in communicative connection with each other. Moreover, memory 600 may be volatile memory and/or non-volatile memory. In some embodiments, memory 600 may include a pagefile, swap partition, or other allocation such that a non-volatile portion of memory 600 may function as volatile memory.

As depicted in FIG. 6, memory 600 may store one or more drivers 601. For example, the one or more drivers 601 may receive a video stream from a video recording device or otherwise facilitate the transmission of the video stream from the video recording device to memory 600. Additionally, as depicted in FIG. 6, the one or more drivers 601 may receive an audio stream from an audio recording device or otherwise facilitate the transmission of the audio stream form the audio recording device to memory 600. Although depicted as standalone in FIG. 6, at least one of the one or more drivers 601 may form a portion of an operating system in memory 600.

As further depicted in FIG. 6, memory 600 store a video stream subapplication 603 that forms a portion of a first communications application 605. For example, video stream subapplication 603 may comprise instructions to receive the video stream from the video recording device (and/or from or using the one or more drivers 601) and compress the video stream using codec 607. For example, codec 607 may be selected because the output thereof is compatible with first communications application 605 and/or second communications application 611.

As depicted in FIG. 6, video stream subapplication 603 may further comprise instructions to receive the audio stream from the audio recording device (and/or from or using the one or more drivers 601) and compress the audio stream using codec 608. For example, codec 608 may be selected because the output thereof is compatible with first communications application 605 and/or second communications application 611. Although depicted as separate in FIG. 6, codec 607 and codec 608 may comprise the same codec or may be modular.

Video stream subapplication 603 may direct the compressed video stream to allocated portion 609. In addition, as depicted in FIG. 6, video stream subapplication may direct the compressed audio stream to allocated portion 610. Although depicted as separate in FIG. 6, allocated portion 609 and allocated portion 610 may comprise one portion.

In some embodiments, allocated portion 609 and/or allocated portion 610 may comprise a particular number of blocks from a heap or a free store of memory 600. In certain aspects, allocated portion 609 and/or allocated portion 610 may be chunked in order to lessen (or even eliminate) fragmentation. In certain aspects, the sizes of allocated portion 609 and/or allocated portion 610 may be fixed. In some embodiments, the video stream and/or audio stream may be buffered as a loop recording. For example, the oldest portion of the buffered video stream and/or audio stream in allocated portion 609 and/or allocated portion 610 may be deleted when the allocated blocks are full (or exceeding a capacity threshold, such as 90%, 80%, etc., or 100 MB, 50 MB, etc.), and the newest portion of the buffered video stream and/or audio stream may then be stored in allocated portion 609 and/or allocated portion 610.

In other embodiments, the sizes of allocated portion 609 and/or allocated portion 610 may be variable. For example, allocated portion 609 and/or allocated portion 610 may be slab allocated such that one or more caches of allocated portion 609 and/or allocated portion 610 may expand and/or shrink. In such an example, the one or more caches may expand and/or shrink based on capacity thresholds, as explained above. In some embodiments, the video stream and/or audio stream may be buffered as a loop recording, as explained above.

Video stream subapplication 603 may allow the first communications application 605 access to the compressed video stream from allocated portion 609. Although not depicted in FIG. 6, video stream subapplication may also allow the first communications application 605 access to the compressed audio stream from allocated portion 610. In addition, as depicted in FIG. 6, video stream subapplication 603 (and/or first communications application 605) may allow a second communications application 611 access to the compressed video stream from allocated portion 609 and/or the compressed audio stream from allocated portion 610. For example, as depicted in FIG. 6, video stream subapplication 603 (and/or first communications application 605) may provide a pointer (or other reference) to allocated portion 609 and/or allocated portion 610 and/or may provide the compressed video stream and/or compressed audio stream directly.

In some embodiments, first communications application 605 and second communications application 611 may access the compressed video stream and/or compressed audio stream in different ways. For example, first communications application 605 may receive the compressed video stream and/or compressed audio stream directly from video stream subapplication 603 while second communications application 611 may receive a pointer to allocated portion 609 and/or to allocated portion 610 from video stream subapplication 603 (and/or from first communications application 605), or vice versa. Additionally or alternatively, first communications application 605 may receive the compressed video stream directly from video stream subapplication 603 and receive a pointer to allocated portion 610 from video stream subapplication 603, or vice versa. Similarly, second communications application 611 may receive the compressed audio stream directly from video stream subapplication 603 and receive a pointer to allocated portion 609 from video stream subapplication 603, or vice versa.

Figure 7:
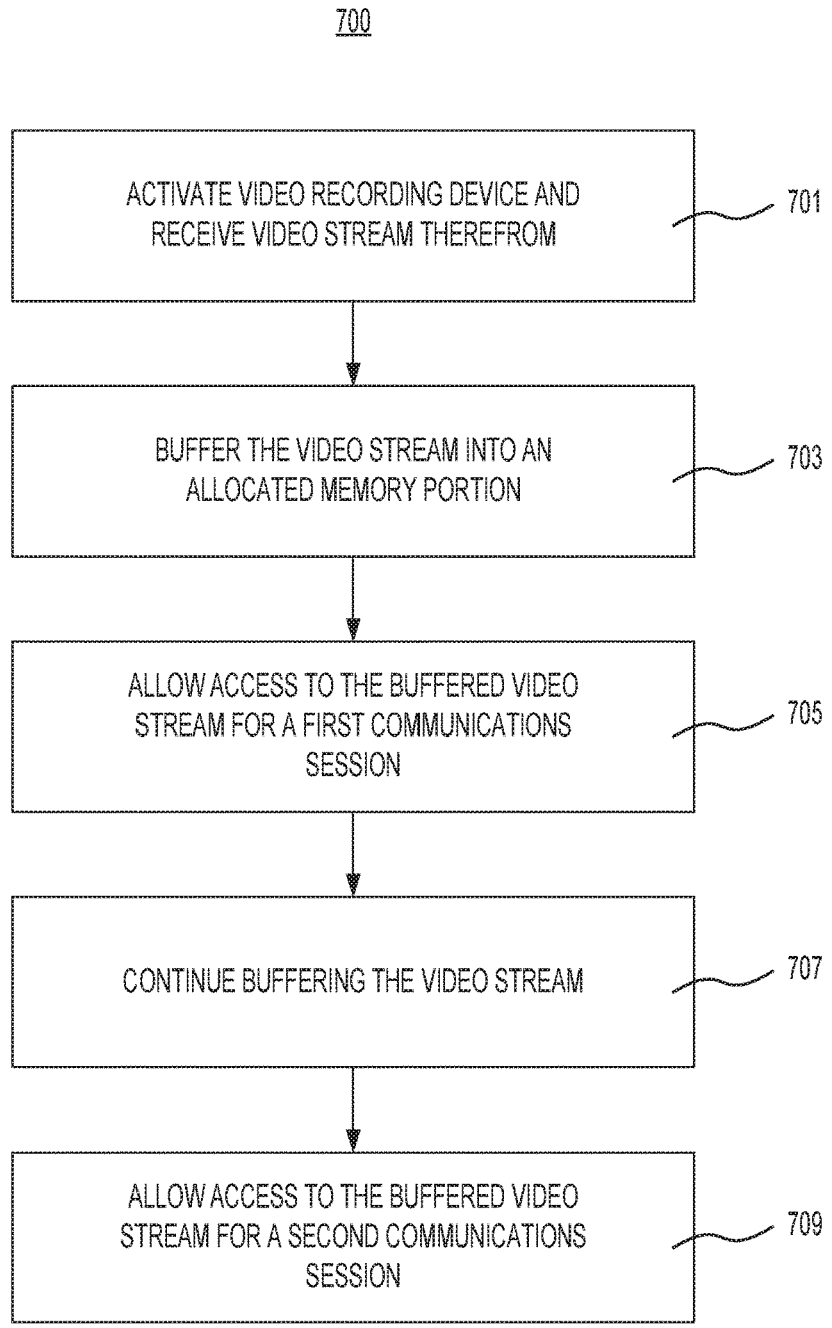
FIG. 7 is a flowchart of an example method for providing a video stream to one or more communication sessions, according to an example embodiment of the present disclosure.

FIG. 7 depicts an example method 700 for providing a video stream to one or more communication sessions. Method 700 may be implemented using one or more processors (e.g., processor 105 of FIG. 1 and/or processor 803 of FIG. 8) in communication with one or more memories (e.g., memory 107 of FIG. 1, memory 200 of FIG. 2, memory 300 of FIG. 3, memories 400 and 410 of FIG. 4, memory 500 of FIG. 5, memory 600 of FIG. 6, and/or memory 805 of FIG. 8).

At step 701, the processor may activate the video recording device and receive a video stream therefrom. For example, the processor may flip one or more switches that permit power to be provided to the video recording device. Alternatively or concurrently, the processor may generate an analog and/or digital signal that instructs the video recording device to begin recording a video and may send the generated signal to the video recording device. The processor may receive the video stream after activation of the video recording device.

Alternatively or concurrently, the processor may activate an audio recording device and receive an audio stream therefrom. For example, as described above, the processor may flip one or more switches that permit power to be provided to the audio recording device. Alternatively or concurrently, the processor may generate an analog and/or digital signal that instructs the audio recording device to begin recording audio and may send the generated signal to the audio recording device. The processor may receive the audio stream after activation of the audio recording device.

In embodiments having both a video recording device and an audio recording device, the processor may activate the audio recording device concurrently with (or immediately prior to activating or immediately after activating) the video recording device. Alternatively, the processor may activate the audio recording device prior to activating the video recording device or after activating the video recording device.

In some embodiments, the processor may activate the audio recording device when at least one of a first communications session and a second communications session are started. Accordingly, the processor may activate the audio recording device after step 705, after step 707, or after step 709.

At step 703, the processor may buffer the video stream in an allocated portion of the memory. For example, as explained above, the processor may allocate a particular number of blocks from a heap or a free store of the memory and then buffer the video stream using the allocated blocks. In certain aspects, the allocation of the blocks may be performed using chunking.

In some embodiments, the allocation may be fixed. In other embodiments, the allocation may be variable. For example, the processor may use slab allocation.

In some embodiments, the video stream may be buffered to the allocated portion in an uncompressed format. Alternatively, the processor may compress the received video stream using at least one codec such that the buffered video stream is compressed. For example, the codec may be selected based on one or more computer programs managing the first communications session and/or one or more computer programs managing the second communications session.

In embodiments where the processor receives an audio stream, the processor may buffer the audio stream to the same allocated portion as the video stream and/or to a different allocated portion. In some embodiments, the audio stream may be buffered in an uncompressed format. Alternatively, the processor may compress the received audio stream using at least one codec such that the buffered audio stream is compressed. For example, the codec may be selected based on one or more computer programs managing the first communications session and/or one or more computer programs managing the second communications session. The codec may be the same codec as used for the video stream or may be a separate codec.

In some embodiments, the processor may implement loop recording for the video stream. Alternatively or concurrently, the processor may implement loop recording the audio stream.

At step 705, the processor may allow access to the buffered video stream for use in a first communications session. For example, the first communications session may be managed by one or more computer programs executed on the processor (and/or one or more other processors). In certain aspects, the instructions to buffer the video stream to the allocated portion of memory may comprise at least a portion of a computer program distinct from the one or more computer programs managing the first communications session. Alternatively or concurrently, the instructions to buffer the video stream to the allocated portion of memory may comprise at least a portion of the one or more computer programs managing the first communications session.

Similarly, the allocated portion may be distinct from a portion of the memory storing the one or more computer programs managing the first communications session. Alternatively, at least a portion of the allocated portion may be a portion of the memory managed by the one or more computer programs managing the first communications session.

In some embodiments, allowing access to the buffered video stream may comprise providing a pointer reference to the allocated portion of the memory to which the video stream is buffered. The pointer reference may be mutable or immutable. Alternatively or concurrently, the processor may allow access to the buffered video stream by providing the video stream (whether uncompressed or compressed) to the one or more computer programs managing the first communications session. Certain aspects may comprise a combination of a pointer reference and direct access to the video stream. For example, the one or more computer programs managing the first communications session may receive a pointer reference when initiating the first communications sessions and then may receive the video stream directly after the first communications session has been activated or in use for a certain period of time (e.g., 5 seconds, 30 seconds, etc.), or vice versa.

Similarly, in embodiments where the processor also buffers an audio stream, the processor may allow access to the buffered audio stream for use in the first communications session. In some embodiments, allowing access to the buffered audio stream may comprise providing a pointer reference to the allocated portion of the memory to which the audio stream is buffered. Alternatively or concurrently, the processor may allow access to the buffered audio stream by providing the audio stream (whether uncompressed or compressed) to the one or more computer programs managing the first communications session. Certain aspects may comprise a combination of a pointer reference and direct access to the audio stream. For example, the one or more computer programs managing the first communications session may receive a pointer reference when initiating the first communications sessions and then may receive the audio stream directly after the first communications session has been activated or in use for a certain period of time (e.g., 5 seconds, 30 seconds, etc.), or vice versa.

At step 707, the processor may continue buffering the video stream after the buffered video stream has been accessed for use in the first communications session. For example, the processor may continue buffering the video stream even as the one or more computer programs managing the first communications session access the already-buffered video stream from the allocated portion, either directly and/or by using a pointer reference.

At step 709, the processor may allow access to the buffered video stream for use in a second communications session. For example, the second communications session may be managed by one or more computer programs executed on the processor (and/or one or more other processors). At least one of the one or more computer programs managing the second communications session may be the same program(s) managing the first communications session. Alternatively, the one or more computer programs managing the second communications session may be different from the program(s) managing the first communications session.

In certain aspects, the instructions to buffer the video stream to the allocated portion of memory may comprise at least a portion of a computer program distinct from the one or more computer programs managing the second communications session. Alternatively or concurrently, the instructions to buffer the video stream to the allocated portion of memory may comprise at least a portion of the one or more computer programs managing the second communications session.

Similarly, the allocated portion of the memory may be distinct from a portion of the memory storing one or more computer programs managing the second communications session. Alternatively, at least a portion of the allocated portion may be a portion of the memory managed by the one or more computer programs managing the second communications session.

In some embodiments, allowing access to the buffered video stream may comprise providing a pointer reference to the allocated portion of the memory to which the video stream is buffered. The pointer reference may be mutable or immutable. Alternatively or concurrently, the processor may allow access to the buffered video stream by providing the video stream (whether uncompressed or compressed) to the one or more computer programs managing the first communications session. Certain aspects may comprise a combination of a pointer reference and direct access to the video stream. For example, the one or more computer programs managing the second communications session may receive a pointer reference when initiating the second communications sessions and then may receive the video stream directly after the first communications session has been activated or in use for a certain period of time (e.g., 5 seconds, 30 seconds, etc.), or vice versa.

Similarly, in embodiments where the processor also buffers an audio stream, the processor may allow access to the buffered video stream for use in the second communications session. In some embodiments, allowing access to the buffered audio stream may comprise providing a pointer reference to the allocated portion of the memory to which the audio stream is buffered. Alternatively or concurrently, the processor may allow access to the buffered audio stream by providing the audio stream (whether uncompressed or compressed) to the one or more computer programs managing the second communications session. Certain aspects may comprise a combination of a pointer reference and direct access to the audio stream. For example, the one or more computer programs managing the second communications session may receive a pointer reference when initiating the first communications sessions and then may receive the audio stream directly after the first communications session has been activated or in use for a certain period of time (e.g., 5 seconds, 30 seconds, etc.), or vice versa.

Method 700 may include additional steps. For example, as explained above, method 700 may further include compressing the received video stream using at least one codec. Accordingly, the buffered video stream may be compressed. In embodiments where the processor receives an audio stream, method 700 may further include compressing the received audio stream using at least one codec. The at least one codec may be, at least in part, the same codec as used to compress the video stream. Accordingly, the buffered audio stream may be compressed. In certain aspects, the at least one codec (for the video stream and/or for the audio stream) may be selected based on the one or more computer programs managing at least one of the first communications session and the second communications session.

In some embodiments, at least one of the first communications session and the second communications session may be paused. In such embodiments, method 700 may further include continue buffering the video stream after at least one of the first communications session and the second communications session are paused. Moreover, method 700 may include allowing access to the buffered video stream for use in the one or more paused communications sessions when resumed.

As explained above, FIG. 8 is block diagram of an example user interface device 800 suitable for implementing the disclosed systems and methods. User interface device 800 may comprise a tablet, laptop computer, smartphone, or the like.

As depicted in FIG. 8, user interface device 800 may include at least one processor (e.g., processor 803) and at least one memory (e.g., memory 805).

Processor 803 may comprise a central processing unit (CPU), a graphics processing unit (GPU), or other similar circuitry capable of performing one or more operations on a data stream. Processor 803 may be configured to execute instructions that may, for example, be stored on memory 805.

Memory 805 may be volatile memory (such as RAM or the like) and/or non-volatile memory (such as flash memory, a hard disk drive, or the like). As explained above, memory 805 may store instructions for execution by processor 803.

As depicted in FIG. 8, memory 805 may store one or more programs 807. For example, programs 807 may include one or more communication applications 809, which may facilitate communications sessions (e.g., using network interface controller 815, explained below). By way of further example, programs 807 may include an operating system 811, such as DRAWIN, RTXC, LINUX, iOS, UNIX, OS X, WINDOWS, or an embedded operating system such as VXWorkS. Operating system 811 may include instructions for handling basic system services and for performing hardware dependent tasks. In some implementations, operating system 811 may comprise a kernel (e.g., UNIX kernel). Memory 805 may further store data 813, which may be computed results from one or more programs 807, data received from network interface controller 815, data retrieved from storage device 821, and/or the like.

As further depicted in FIG. 8, user interface device 800 may include at least one network interface controller (NIC) (e.g., NIC 815). NIC 815 may be configured to facilitate communication over at least one computing network (e.g., network 817). Communication functions may thus be facilitated through one or more NICs, which may be wireless and/or wired and may include an Ethernet port, radio frequency receivers and transmitters, and/or optical (e.g., infrared) receivers and transmitters. The specific design and implementation of the one or more NICs depend on the computing network 817 over which user interface device 800 is intended to operate. For example, in some embodiments, user interface device 800 may include one or more wireless and/or wired NICs designed to operate over a GSM network, a GPRS network, an EDGE network, a Wi-Fi or WiMax network, and a Bluetooth® network. Alternatively or concurrently, user interface device 800 may include one or more wireless and/or wired NICs designed to operate over a TCP/IP network.

As depicted in FIG. 8, user interface device 800 may include and/or be operably connected to a storage device 821. Storage device 821 may be volatile (such as RAM or the like) or non-volatile (such as flash memory, a hard disk drive, or the like).

I/O module 819 may enable communications between processor 803, memory 805, NIC 815, and/or storage device 821.

Processor 803, memory 805, NIC 815, and/or storage device 821 may comprise separate components or may be integrated in one or more integrated circuits. The various components in user interface device 800 may be coupled by one or more communication buses or signal lines (not shown).

Each of the above identified instructions and applications may correspond to a set of instructions for performing one or more functions described above. These instructions need not be implemented as separate software programs, procedures, or modules. Memory 805 may include additional instructions or fewer instructions. Furthermore, various functions of conference server 601 may be implemented in hardware and/or in software, including in one or more signal processing and/or application specific integrated circuits.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for providing a video stream to one or more communication sessions, the system comprising:
    a video recording device;
    a memory storing instructions; and
    a processor configured to execute the instructions to:
        activate the video recording device and receive a video stream therefrom,
        buffer the video stream in an allocated portion of the memory,
        allow access to the buffered video stream for use in a first communications session by providing a pointer reference to the allocated portion of the memory to which the video stream is buffered,
        continue buffering the video stream after the buffered video stream has been accessed for use in the first communications session, and
        allow access to the buffered video stream for use in a second communications session by providing the pointer reference to the allocated portion of the memory to which the video stream is buffered,
        wherein the instructions comprise a computer program distinct from at least one of a computer program managing the first communications session and a computer program managing the second communications session.

2. The system of claim 1, wherein the instructions comprise a computer program distinct from the computer program managing the first communications session and the computer program managing the second communications session.

3. The system of claim 1, wherein the instructions comprise at least a portion of the computer program managing the first communications session or the computer program managing the second communications session.

4. The system of claim 1, wherein the allocated portion of the memory is distinct from a portion of the memory storing one or more computer programs managing the first communications session and the second communications session.

5. The system of claim 1, wherein the buffered video stream is uncompressed.

6. The system of claim 1, wherein the instructions further comprise instructions to compress the received video stream using at least one codec, and wherein the buffered video stream is compressed.

7. The system of claim 6, wherein the at least one codec is selected based on at least one of the computer program managing first communications session and the computer program managing the second communications session.

8. The system of claim 1, further comprising an audio recording device.

9. The system of claim 8, wherein the instructions further comprise instructions to activate the audio recording device and receive an audio stream therefrom.

10. The system of claim 9, wherein the audio recording device is activated when at least one of the first communications session and the second communications session are started.

11. The system of claim 9, wherein the instructions further comprise instructions to buffer the audio stream in a second allocated portion of the memory and allow access to the buffered audio stream for use in at least one of the first communications session and the second communications session.

12. The system of claim 1, wherein the instructions further comprise instructions to continue buffering the video stream after at least one of the first communications session and the second communications session are paused.

13. The system of claim 12, wherein the instructions further comprise instructions to allow access to the buffered video stream for use in the one or more paused communications sessions when resumed.

14. The system of claim 1, wherein the pointer reference comprises a mutable pointer.

15. The system of claim 1, wherein the pointer reference comprises an immutable pointer.

16. A computer-implemented method for providing a video stream to one or more communication sessions, the method comprising:
    activating a video recording device and receiving a video stream therefrom;
    buffering the video stream in an allocated portion of a memory;
    allowing access to the buffered video stream for use in a first communications session by providing a pointer reference to the allocated portion of the memory to which the video stream is buffered;
    continue buffering the video stream after the buffered video stream has been accessed for use in the first communications session; and
    allowing access to the buffered video stream for use in a second communications session by providing the pointer reference to the allocated portion of the memory to which the video stream is buffered,
    wherein the computer-implemented method is embodied in a computer program distinct from at least one of a computer program managing the first communications session and a computer program manacling the second communications session.

17. The method of claim 16, further comprising:
    compressing the received video stream using at least one codec,
    wherein the buffered video stream is compressed, and
    wherein the at least one codec is selected based on at least one of the computer program managing first communications session and the computer program managing the second communications session.

18. A non-transitory computer-readable medium storing instructions that, when executed by one or more processors, cause the one or more processors to:
    activate a video recording device and receiving a video stream therefrom;
    buffer the video stream in an allocated portion of a memory;
    allow access to the buffered video stream for use in a first communications session by providing a pointer reference to the allocated portion of the memory to which the video stream is buffered;
    continue buffering the video stream after the buffered video stream has been accessed for use in the first communications session; and
    allow access to the buffered video stream for use in a second communications session by providing the pointer reference to the allocated portion of the memory to which the video stream is buffered,
    wherein the instructions comprise a computer program distinct from at least one of a computer program manacling the first communications session and a computer program managing the second communications session.

19. The non-transitory computer-readable medium of claim 18, wherein the instructions comprise a computer program distinct from the computer program managing the first communications session and the computer program managing the second communications session.

20. The non-transitory computer-readable medium of claim 18, wherein the instructions comprise at least a portion of the computer program managing the first communications session or the computer program manacling the second communications session.

\* \* \* \* \*